United States Patent
Genge

(10) Patent No.: US 8,434,979 B1
(45) Date of Patent: May 7, 2013

(54) PORTABLE GEAR RATCHET FOR TIE-DOWNS

(76) Inventor: David Genge, Red Deer (CA)

( * ) Notice: Subject to any disclaimer, the term of this patent is extended or adjusted under 35 U.S.C. 154(b) by 45 days.

(21) Appl. No.: 13/103,675

(22) Filed: May 9, 2011

(51) Int. Cl.
*B61D 45/00* (2006.01)

(52) U.S. Cl.
USPC .......................................................... 410/103

(58) Field of Classification Search ............... 410/12, 410/97, 100, 101, 103, 106; 24/68 CD, 265 CD; 248/499
See application file for complete search history.

(56) References Cited

U.S. PATENT DOCUMENTS

| | | | |
|---|---|---|---|
| 2,449,600 A * | 9/1948 | Geiger ........................ | 410/100 |
| 3,240,473 A * | 3/1966 | Coffey et al. ............... | 410/103 |
| 3,428,331 A * | 2/1969 | Morgan et al. .............. | 410/100 |
| 3,848,889 A * | 11/1974 | Sharrow ...................... | 410/103 |
| 4,382,736 A * | 5/1983 | Thomas ....................... | 410/104 |
| 4,910,833 A * | 3/1990 | Barbour et al. ............. | 24/68 CT |
| 4,913,608 A | 4/1990 | Royball | |
| 5,139,375 A * | 8/1992 | Franchuk ..................... | 410/105 |
| 5,217,208 A * | 6/1993 | Stephenson ................. | 254/213 |
| 5,516,246 A * | 5/1996 | Helton ......................... | 410/101 |
| 5,549,429 A | 8/1996 | Sergent | |
| 5,791,844 A | 8/1998 | Anderson | |
| 5,961,263 A * | 10/1999 | Nunez ......................... | 410/103 |
| 6,059,499 A * | 5/2000 | Bird ............................. | 410/103 |
| 6,467,716 B1 * | 10/2002 | Hamilton .................... | 242/394 |
| 6,609,275 B1 * | 8/2003 | Lin ............................. | 24/68 CD |
| 6,698,723 B1 | 3/2004 | Antonini | |
| 6,719,507 B2 | 4/2004 | Botelho | |
| 6,729,604 B1 | 5/2004 | Claycomb | |
| 6,742,972 B2 * | 6/2004 | Brunet ......................... | 410/103 |
| 6,824,339 B1 * | 11/2004 | Childers ...................... | 410/103 |
| 6,899,497 B2 * | 5/2005 | Cardona et al. ............. | 410/12 |
| 7,090,449 B1 * | 8/2006 | Hugg .......................... | 410/102 |
| 7,108,246 B2 | 9/2006 | Fortin | |
| 7,131,804 B2 * | 11/2006 | Sawchuk .................... | 410/100 |
| 7,195,433 B2 * | 3/2007 | Cash ........................... | 410/100 |
| 7,216,849 B2 * | 5/2007 | Tremblay .................... | 254/220 |
| 7,469,916 B2 | 12/2008 | Watson | |
| 8,025,470 B2 * | 9/2011 | Ruan ........................... | 410/103 |
| 2001/0038778 A1 * | 11/2001 | Tatina ......................... | 410/100 |
| 2006/0177282 A1 * | 8/2006 | Blosser ....................... | 410/106 |
| 2007/0189873 A1 * | 8/2007 | Breeden ...................... | 410/100 |
| 2009/0041557 A1 * | 2/2009 | Lin ............................. | 410/97 |

FOREIGN PATENT DOCUMENTS

DE 4213821 A1 * 5/1993

* cited by examiner

*Primary Examiner* — H Gutman
(74) *Attorney, Agent, or Firm* — Montgomery Patent & Design; Robert C. Montgomery

(57) ABSTRACT

An apparatus to assist tightening of cargo straps used on flat-bed vehicles comprises a gearbox having a worm gear and matching wheel gear to tighten the strap. The output of the gearbox is coupled to a tie-down strap. The apparatus enables a user to quickly and properly tighten a tie-down strap regardless of the user's physical size and strength. The apparatus can be provided at each tie-down strap or be moved from strap location to strap location as desired.

18 Claims, 7 Drawing Sheets

PORTABLE GEAR RATCHET FOR TIE-DOWNS

RELATED APPLICATIONS

The present invention was first described in and claims the benefit of U.S. Provisional Application No. 61/322,269 filed May 7, 2010, the entire disclosure of which is incorporated herein by reference.

FIELD OF THE INVENTION

The present invention relates generally to tie-down assemblies for cargo straps, and in particular, to a portable gear ratchet mechanism used to tighten and secure cargo straps.

BACKGROUND OF THE INVENTION

Load straps are a common tool in the trucking industry. They are used to secure loads, primarily on flat bed trailers of tractor-trailer rigs. Load straps are useful because they readily adapt to any size load and securely hold those loads over long distances, such as across interstate highways. However, as with most mechanical items, they must be properly used to be effective.

When load straps are not installed sufficiently tightly, the cargo can move about and sometimes even fall from the truck. Many drivers use a bar to tighten load straps in their bracket. However, this is a time consuming process because the bar must be repeatedly inserted and removed in the tightening process. This excessive time sometimes causes users to not properly apply the straps in an effort to save time. Even when done properly, many truck drivers with diminished strength or those who are slightly disabled cannot apply enough pressure to correctly tension the straps.

Various attempts have been made to provide winch-type assisting mechanisms for installing and tightening load straps. Examples of these attempts can be seen by reference to several U.S. patents, such as U.S. Pat. No. 5,433,565; U.S. Pat. No. 5,791,844; U.S. Pat. No. 6,719,507; U.S. Pat. No. 6,729,604; U.S. Pat. No. 7,108,246; and U.S. Pat. No. 7,469,916. However, none of these designs are similar to the present invention.

While these apparatuses fulfill their respective, particular objectives, each of these references suffer from one (1) or more of the aforementioned disadvantages. Many such apparatuses are difficult to install. Many such apparatuses do not work easily with external load straps. Many such apparatuses do not adequately secure the load strap once installed and can come loose during use. Many such apparatuses are difficult to tighten. Many such apparatuses can become stuck or tangled easily during use. Accordingly, there exists a need for a mechanism to assist in the installation, tightening, and securement of load straps without the disadvantages as described above. The development of the present invention substantially departs from the conventional solutions and in doing so fulfills this need.

SUMMARY OF THE INVENTION

In view of the foregoing references, the inventor recognized the aforementioned inherent problems and observed that there is a need for a mechanism to assist in the installation, tightening, and securement of load straps in a manner which is simple, safe, and easily operated without need for excessive physical exertion and which is further simple to uninstall after use in order to unload cargo. Thus, the object of the present invention is to solve the aforementioned disadvantages and provide for this need.

To achieve the above objectives, it is an object of the present invention to provide increased mechanical advantage for the installation and tightening of cargo tie-downs or straps. The apparatus is particularly adapted for use with a tractor trailer or similar vehicle, with a desired plurality of the apparatuses being installed and utilized simultaneously. The apparatus includes a case, a take-up roll that receives a strap, a worm gear to adjust the take-up roll, and a ratchet locking mechanism to secure the tightened strap during transport.

Another object of the present invention is to removably fasten to a vehicle with a plurality of fastening members. In the preferred embodiment, the fastening members are a plurality of threaded apertures that enable a user to screw the apparatus against a side of a truck bed.

Yet still another object of the present invention is to construct the apparatus of weather-resistant metal or another weather-resistant material to enable semi-permanent use on a particular exposed truck bed over a prolonged period.

Yet still another object of the present invention is to securely receive and retain an end of a load strap through an axial slot in the take-up roll. The take-up roll can then be rotated in order to wind and tighten the strap.

Yet still another object of the present invention is to include a guide roll adjacent the take-up roll which directs the strap into the axial slot and helps to prevent tangling or unwanted motioning of the strap during transport.

Yet still another object of the present invention is to provide mechanical assistance for winding the take-up roll using a worm gear and wheel gear mechanism. The wheel gear is affixed to the take-up roll and housed within the case. The worm gear is a spiral-threaded cylindrical gear with a plurality of teeth engaging the wheel gear. The high gearing ratio between the worm gear and wheel gear provides a higher mechanical advantage than the common method of applying a lever device onto a separate ratchet mechanism.

Yet still another object of the present invention is to facilitate turning of the worm gear with a manual hand crank. The hand crank includes an input drive that removably engages an extension drive end portion of the worm gear. A user can engage the input drive with the extension drive, grip a handle of the hand crank, and rotate the handle to wind the worm gear, wheel gear, and take-up strap in a comfortable and assisted manner.

Yet still another object of the present invention is to automatically lock the take-up roll and thereby secure the strap when in a tightened state with an integral ratchet wheel and pawl. The ratchet wheel is affixed to the take-up roll and the pawl prevents unwinding of the ratchet wheel and take-up roll. The user can manually lift the pawl upward to disengage the pawl from the ratchet wheel as desired, such that the take-up roll and strap can be loosened for removal after use.

Yet still another object of the present invention is to provide a method of utilizing the device that provides a unique means of installing one (1) or more of the apparatus on a vehicle, installing an open end of a strap into an axial slot of a take-up roll, engaging the extension drive with the input drive of the crank, rotating the crank to cause the worm gear rotate and concurrently drive the wheel gear and the take-up roll to tighten the strap, removing the crank at the end of the tightening procedure, repeating for each strap and apparatus, and lifting a ratchet pawl to enable a ratchet wheel to disengage the strap from the take-up roll as desired.

Further objects and advantages of the present invention will become apparent from a consideration of the drawings and ensuing description.

BRIEF DESCRIPTION OF THE DRAWINGS

The advantages and features of the present disclosure will become better understood with reference to the following more detailed description and claims taken in conjunction with the accompanying drawings, in which like elements are identified with like symbols, and in which:

Figure 1:
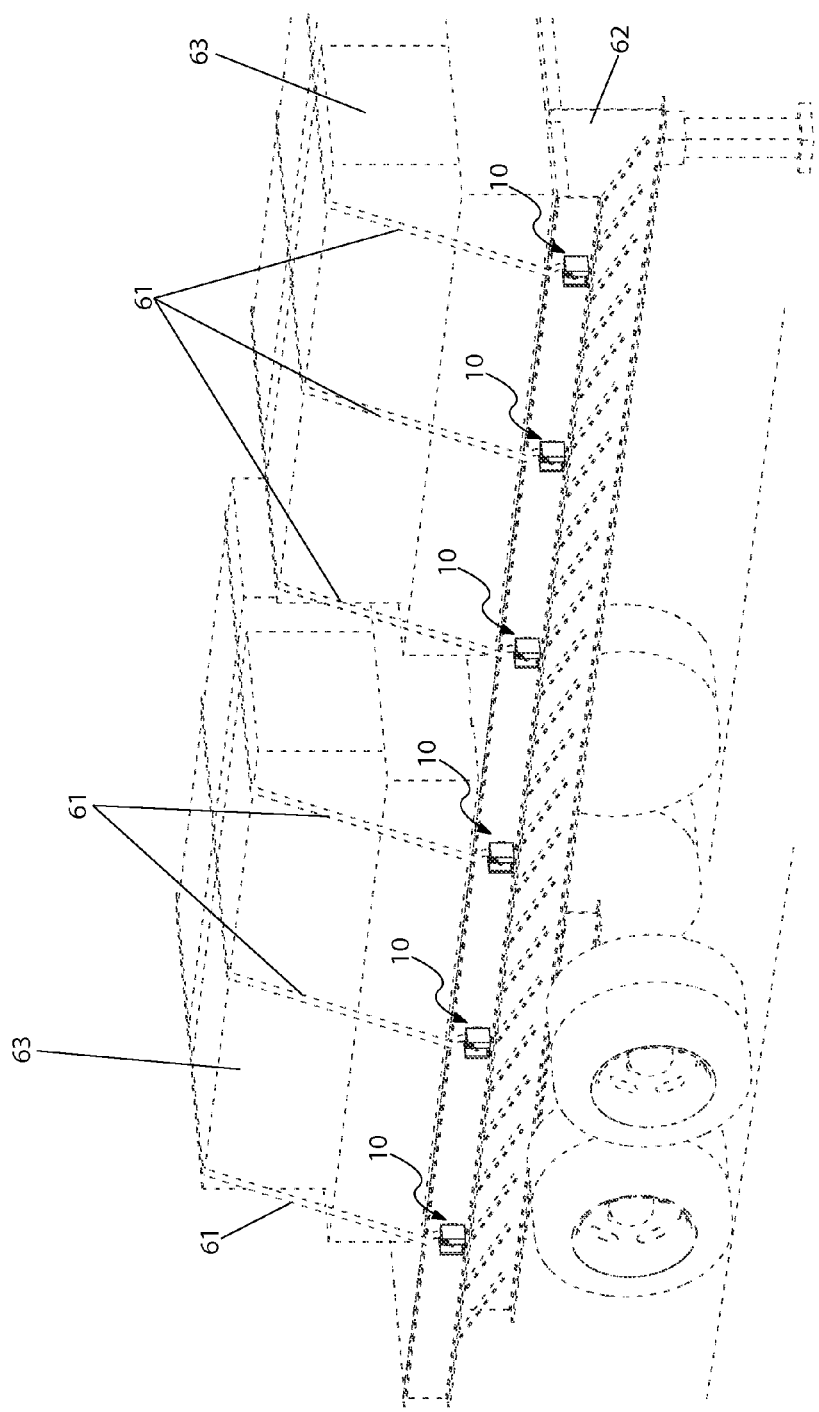
FIG. 1 is an environmental view of a plurality of portable gear ratchet actuators 10 installed onto a vehicle 62, according to a preferred embodiment of the present invention.

DESCRIPTIVE KEY 10 portable gear ratchet actuator
11a case
11b aperture
12 worm gear
13 wheel gear
14 worm extension
15 extension drive
16a take-up roll
16b axial slot
17 ratchet wheel
18a ratchet pawl
18b ratchet pawl axle
19 guide roll
20 crank
21 input drive
22 handle
30 fastening member
31 fastening aperture
61 strap
62 vehicle
63 freight cover
70 magnet
75 spring clamp

DETAILED DESCRIPTION OF THE PREFERRED EMBODIMENT

In accordance with the invention, the best mode is presented in terms of a preferred embodiment, herein depicted within FIGS. 1 through 5c. However, the disclosure is not limited to a single described embodiment and a person skilled in the art will appreciate that many other embodiments are possible without deviating from the basic concept of the disclosure and that any such work around will also fall under its scope. It is envisioned that other styles and configurations can be easily incorporated into the teachings of the present disclosure, and only one particular configuration may be shown and described for purposes of clarity and disclosure and not by way of limitation of scope.

The terms "a" and "an" herein do not denote a limitation of quantity, but rather denote the presence of at least one of the referenced items.

The present invention describes a portable gear ratchet actuator (herein described as the "apparatus"), which provides a means for increasing a mechanical advantage in the installation of cargo ties-down or straps 61.

Referring now to FIG. 1, an environmental view of a plurality of the apparatuses 10 installed onto a vehicle 62, according to the preferred embodiment of the present invention, is disclosed. The vehicle 62 utilized is preferably a tractor trailer or the like which further utilizes a freight cover 63 to protect the load being transported. The freight cover 63 is secured via a plurality of straps 61 and the apparatus 10 assists in fixing said straps 61 firmly against the load.

Figure 2:
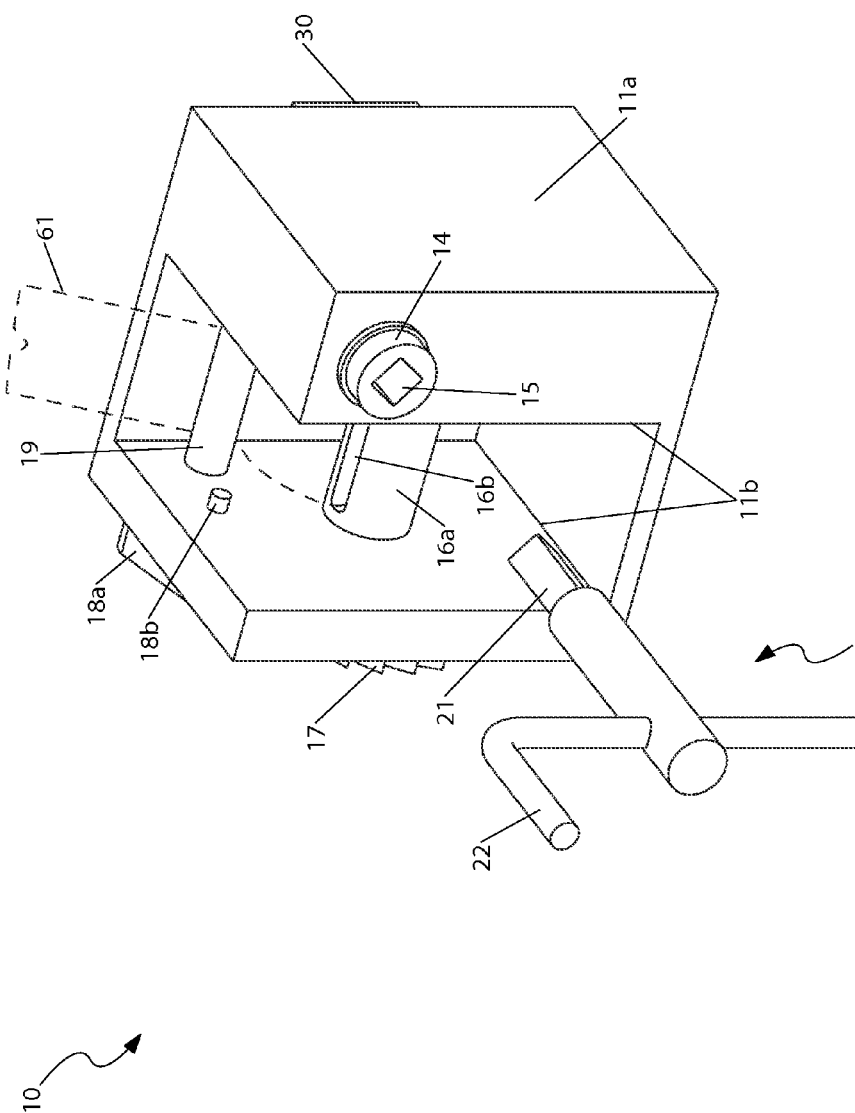
FIG. 2 is a front perspective view of the portable gear ratchet actuator 10, according to a preferred embodiment of the present invention.

Referring now to FIG. 2, a front perspective view of the apparatus 10, according to the preferred embodiment of the present invention, is disclosed. The apparatus 10 comprises an integral locking ratchet mechanism which is enclosed within a six-sided rectangular case 11a. The case 11a is approximately six (6) inches square and preferably fabricated from materials such as a weather resistant metal, a durable plastic, or the like. The case 11a encloses a worm gear 12 in mechanical communication with a wheel gear 13 (see FIG. 3) which rotate a take-up roll 16a to tighten or loosen the strap 61. The case 11a comprises an aperture 11b which partially spans across front and upper sides of said case 11a to provide access to the take-up roll 16a and a guide roll 19 for placement of a strap 61. The take-up roll 16a comprise an axial slot 64 designed to firmly capture an end of the strap 61, while the guide roll 19 keeps the strap 61 aligned with the take-up roll 16a. The axial slot 64 comprises a length greater than the length of common straps 61 to enables placement within. A clockwise rotation of a crank 20 causes the wheel gear 13 (see FIG. 3), and thereby the take-up roll 16a, to rotate in a counterclockwise direction. With the strap 61 guided to pass under the guide roll 19 and over the take-up roll 16a, the counterclockwise rotation develops an increasingly tightening load onto the captured strap 61. The guide roll 19 is rotatably attached to opposing inside surfaces of the aperture 11b portion of the case 11a and positioned slightly behind and above the take-up roll 16a and utilized to guide the strap 61. The take-up roll 16a and guide roll 19 are preferably fabricated from materials similar to the case 11a. The apparatus 10 also comprises a digit-operated hand crank 20 (also see FIG. 3) which enables the user to activate the worm gear 12 to further tighten the strap 61.

Figure 3:
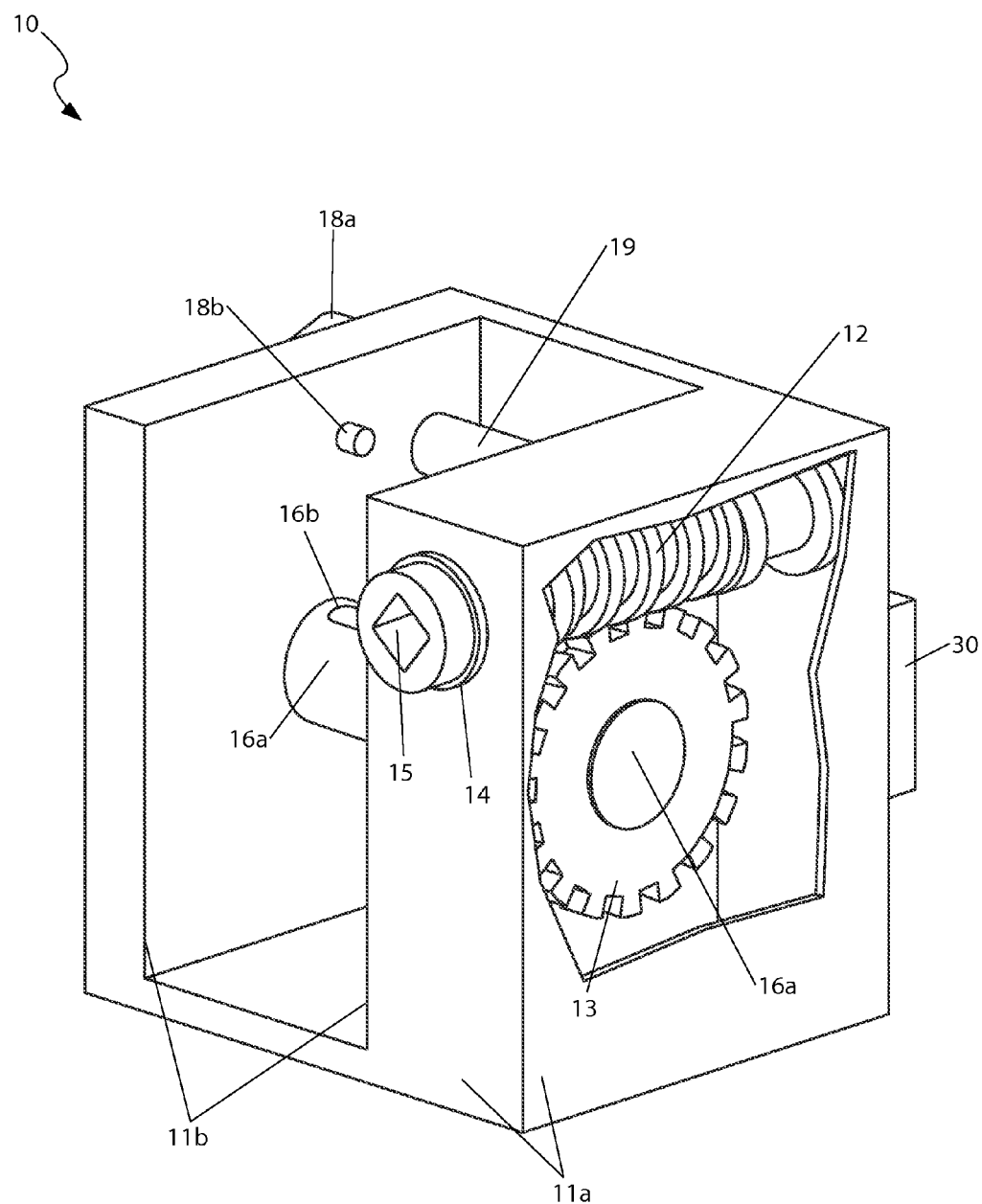
FIG. 3 is a side perspective view of the portable gear ratchet actuator 10 depicting a partially removed surface, according to a preferred embodiment of the present invention.

Referring now to FIG. 3, a side perspective view of the apparatus 10, according to the preferred embodiment of the present invention, is disclosed. A front surface of the case 11a (also see FIG. 2) also comprises a worm extension 14 further comprising an extension drive 15 which enables insertion of the abovementioned crank 20 for tightening of the strap 61. The worm extension 14 is a distal portion of the worm gear 12 and is rotated by means of the crank 20 which comprises an input drive 21 and a handle 22. The input drive 21 and the handle 22 are both integral members of the crank 20 wherein the input drive 21 comprises a profile which is able to engage the extension drive 15 and the handle 22 provides a feature for the user to grasp during use. The crank 20 is fabricated from materials such as, but not limited to: metal, plastic, or the like.

Engaging the input drive 21 of the crank 20 into the extension drive 15 and moving said crank 20 in a circular direction causes the worm gear 12 to rotate, whereby the helical action of said worm gear 12 imparts a rotary motion onto the wheel gear 13 and concurrently to the integral take-up roll 16a. As illustrated herein the worm gear 12 comprises a cylindrical-shape further comprising a plurality of spiraled threads upon the exterior surface which mesh with a plurality of teeth upon the perimeter edge of the disc-shaped wheel gear 13 to drive said wheel gear 13 and take-up roll 16a. The take-up roll 16a is located and fixed to an intermediate portion of the wheel gear 13 which suspends said wheel gear 13 and engages said wheel gear 13 with the worm gear 12. Since the worm gear 12 comprises a high gearing ratio between the wheel gear 13, engaging the apparatus 10 provides a user with a significantly higher mechanical advantage than the normal application of a lever device onto the separate ratchet mechanism.

Figure 4:
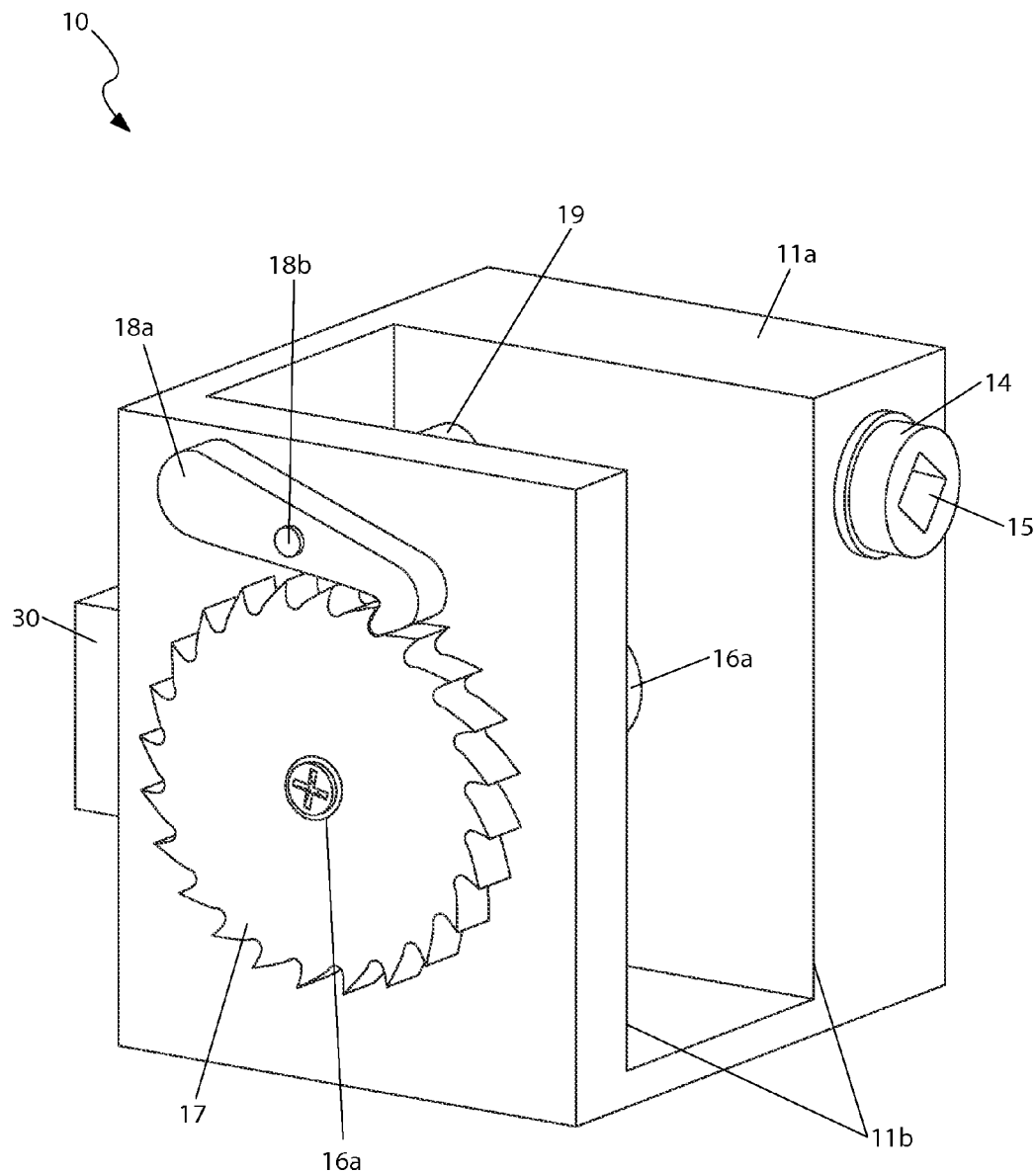
FIG. 4 is an opposing side perspective view of the portable gear ratchet actuator 10, according to a preferred embodiment of the present invention.

Referring now to FIG. 4, an opposing side perspective view of the apparatus 10, according to the preferred embodiment of the present invention, is disclosed. Additionally, the apparatus 10 comprises an integral ratchet wheel 17 and a ratchet pawl 18a which enables the apparatus 10 to lock the take-up roll 16a and secure the strap 61 in a tightened position. The interaction between the worm gear 12 and the wheel gear 13 is non-reversing; therefore, the interaction of the ratchet wheel 17 and the ratchet pawl 18a provide an additional measure of protection against an accidental loosening of the tension generated within the strap 61. The ratchet wheel 17 is fastened to a side of the case 11a opposing and parallel to the wheel gear 13 via a common fastener inserted through said case 11a and into the take-up roll 16a, thereby enabling said ratchet wheel 17 to rotate concurrently with said take-up roll 16a. The ratchet wheel 17 is disc-shaped and comprises a plurality of asymmetric and gently sloped teeth upon the entire exterior surface which are engaged by the ratchet pawl 18a. The ratchet pawl 18a comprises a "J"-shape and is attached above the ratchet wheel 17 via a spring-loaded ratchet pawl axle 18b which is further fastened to the side surface of the case 11a. The ratchet pawl axle 18b enables the ratchet pawl 18a to pivot and slide over the teeth of the ratchet wheel 17 which engages a space between said teeth as said ratchet wheel 18b rotates in a clockwise direction. The ratchet wheel 17 is unable to rotate in a counterclockwise rotation because the ratchet pawl 18a catches the teeth of said ratchet wheel 17 which locks said ratchet pawl 18a against the tooth of said ratchet wheel 17 and prevents any further motion in that direction. The ratchet pawl 18a must be lifted upwardly, thereby disengaging said ratchet pawl 18a from the ratchet wheel 17 and enabling the take-up roll 16a to rotate and further remove the strap 61 from the apparatus 10.

Figure 5A:
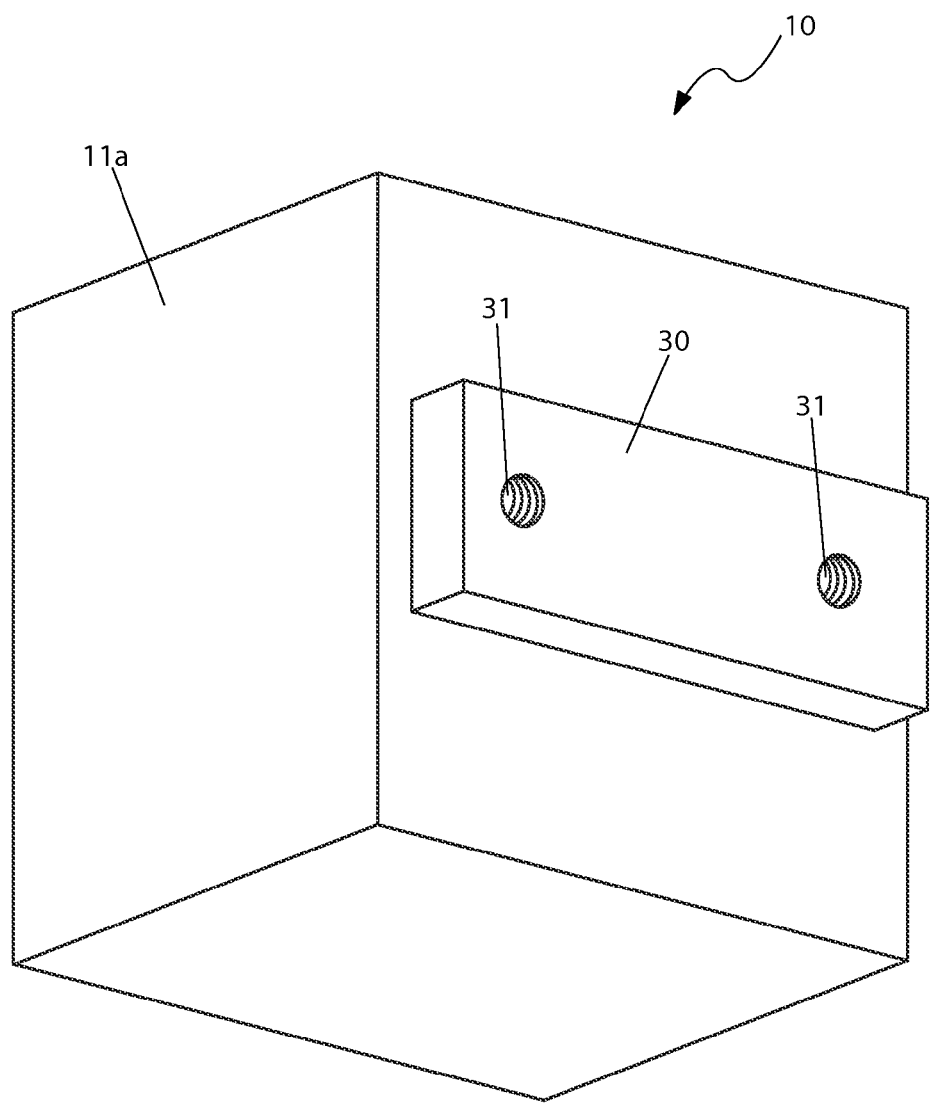
FIG. 5a is a bottom perspective view of the portable gear ratchet actuator 10, according to a preferred embodiment of the present invention.
Figure 5B:
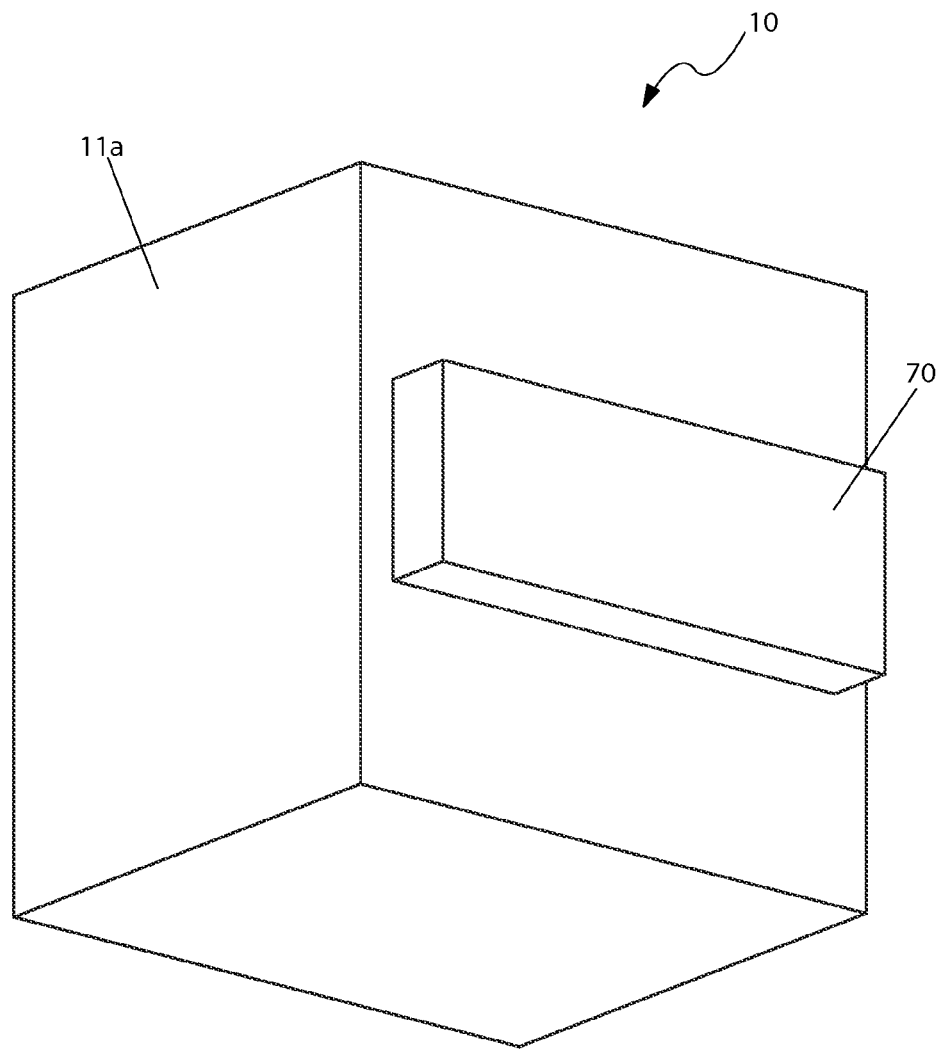
FIG. 5b is another bottom perspective view of the portable gear ratchet actuator 10 depicting a magnet 70, according to a preferred embodiment of the present invention; and, FIG. 5c is yet another bottom perspective view of the portable gear ratchet actuator 10 depicting a spring clamp 75, according to a preferred embodiment of the present invention.
Figure 5C:
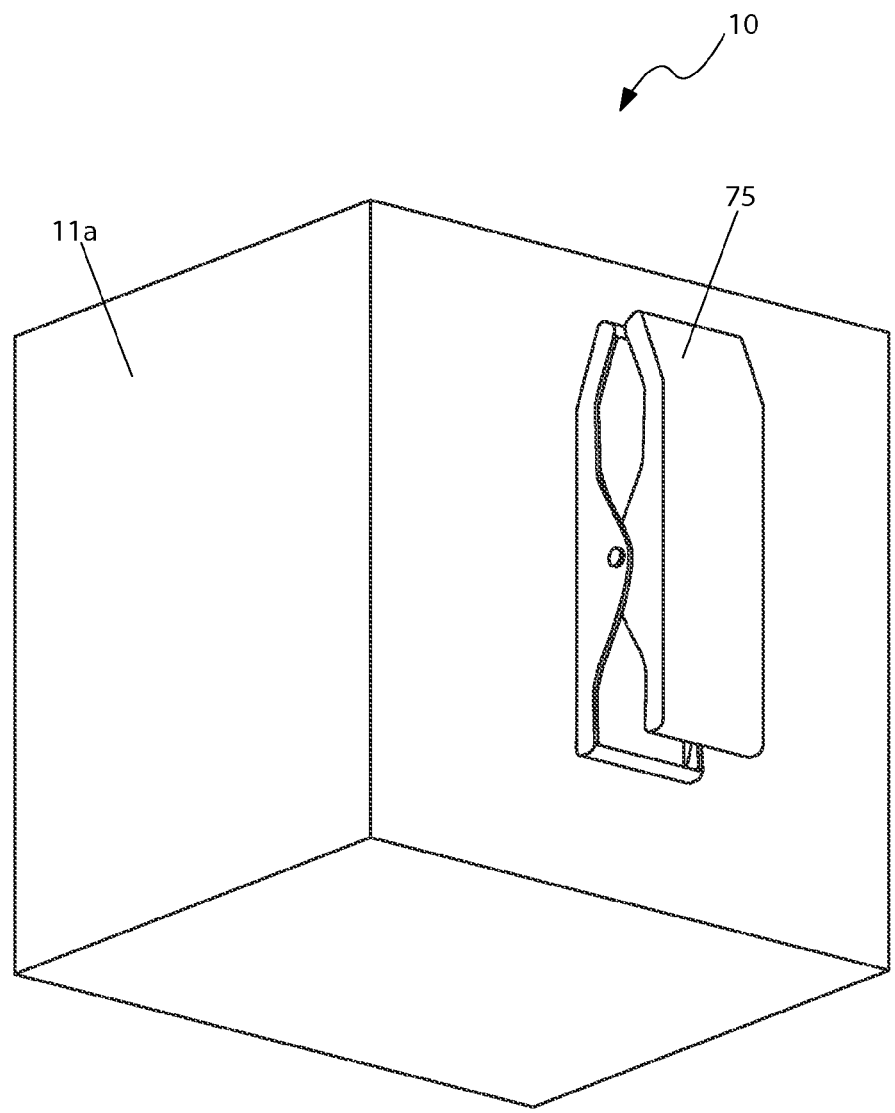

Referring now to FIG. 5a, a bottom perspective view of the apparatus 10, 5b, another bottom perspective view of the apparatus 10 depicting the magnet 70, and FIG. 5c, yet another bottom perspective view of the apparatus 10 depicting the spring clamp 75, according to the preferred embodiment of the present invention, are disclosed. A rear surface of the apparatus 10 comprises a fastening member 30 which provides a means of removably fastening said apparatus 10 onto the structure of the vehicle 62. The fastening member 30 is depicted herein as including a pair of fastening apertures 31 which are preferably threaded upon an interior diameter and engaged by a pair of common threaded fasteners such as threaded screws. The fastening member 30 may utilize other fastening means such as, but not limited to: a permanent magnet 70 (see FIG. 5b), a spring clamp 75 (see FIG. 5c) or the like.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the apparatus 10 it would be installed as indicated in FIG. 1.

The method of utilizing the apparatus 10 may be achieved by performing the following steps: covering the loaded vehicle by installing the freight cover 63; selecting the appropriate load tie-down straps 61; fastening a dead-end of each strap 61 onto a member of one (1) side rail of the vehicle 62; passing the strap 61 over the top portion of the covered cargo toward the opposite side of vehicle 62; installing the open end of each strap 61 into a corresponding axial slot 16b upon the take-up roll 16a; fastening each existing ratchet mechanism onto the opposite side rail of the vehicle 62 via attaching the fastening member 30 thereto; engaging the extension drive 15 within the worm extension 14 with the input drive 21 upon the crank 20; rotating the crank 20 to cause the worm gear 12 to rotate and concurrently drive the wheel gear 13 which simultaneously rotates the take-up tool 16a to tighten the strap 61; removing the crank 20 at the end of the tightening procedure; proceeding to the next desired location of the apparatus 10; repeating the tightening procedure at the location of each apparatus 10; lifting the ratchet pawl 18a to enable the ratchet wheel 17 to rotate in a free counterclockwise rotation to disengage the strap 61 from the take-up roll 16a as desired; and, utilizing the apparatus 10 to load straps 61 upon vehicles 62 more quickly and more safely.

The method of removably attaching each apparatus 10 to the vehicle 62 can be accomplished via the preferred fastening embodiment 30, but may otherwise be attached via the magnetic fastener embodiment 70 or the spring clamp embodiment 75.

The foregoing descriptions of specific embodiments have been presented for purposes of illustration and description. They are not intended to be exhaustive or to limit the invention and method of use to the precise forms disclosed. Various modifications and variations can be appreciated by one skilled in the art in light of the above teachings. The embodiments have been chosen and described in order to best explain the principles and practical application in accordance with the invention to enable those skilled in the art to best utilize the various embodiments with expected modifications as are suited to the particular use contemplated. It is understood that various omissions or substitutions of equivalents are contemplated as circumstance may suggest or render expedient, but is intended to cover the application or implementation without departing from the spirit or scope of the claims of the invention.

What is claimed is:

1. An apparatus for securing a tie-down strap for securing a cargo strap for a load on a vehicle comprises:
   a generally rectangular case, further comprising an aperture located along and partially spanning a width of a top surface and a front surface thereof for permitting passage of said cargo strap;
   a gear assembly housed within said case;
   a take-up assembly operably controlled by said gear assembly, said take-up assembly housed within and attached to said case;
   a crank assembly operably controlling said gear assembly, said crank assembly removably connected to said gear assembly; and,
   a fastening member for removably attaching said apparatus to said vehicle;

wherein said apparatus is detachably removable from a side of said vehicle;

wherein said aperture further permits access to said take-up assembly;

wherein said cargo strap is fed through said take-up assembly and secured thereto;

wherein rotation of said crank assembly operably rotates said gear assembly;

wherein a clockwise rotation of said gear assembly operably rotates said take-up assembly to spool out said cargo strap; and, wherein a counter-clockwise rotation of said gear assembly operably rotates said take-up assembly to reel in said cargo strap.

2. The apparatus of claim 1, wherein said case comprises a waterproof and resilient material of construction.

3. The apparatus of claim 1, wherein said case comprises approximately six square inches in size.

4. The apparatus of claim 1, wherein said gear assembly further comprises:

a worm gear located adjacent to said aperture on a front upper first side of said case and spanning an interior within said case;

a worm gear extension comprising a distal end of said worm gear and extending outward from said case, said worm gear extension further comprising an extension drive;

a wheel gear located within said case and affixed to a first end of said take-up assembly; and, a ratchet assembly affixed to a second end of said take-up assembly along an exterior side of said case;

wherein said worm gear is freely rotatable relative to said case;

wherein said wheel gear is operably driven by and in mechanical communication with said worm gear;

wherein said take-up assembly and said ratchet assembly is operably driven by and is rotated concurrently with said wheel gear;

wherein said crank assembly is removably connected to said extension drive of said worm gear extension to operably control said worm gear; and, wherein said ratchet assembly secures a desired position of said gear assembly to arrest an undesired rotation of said gear assembly.

5. The apparatus of claim 4, wherein said ratchet assembly further comprises:

a ratchet wheel, comprising a plurality of asymmetric sloped teeth about a perimeter thereof; and, a ratchet pawl attached to an outer surface of said case superjacent to said ratchet wheel via a spring-loaded ratchet pawl axle;

wherein said ratchet pawl engages a desired one of said plurality of teeth of said ratchet wheel and arrests further rotation thereof; and, wherein said plurality of teeth of said ratchet wheel are oriented in such a way as to arrest counter-clockwise rotation thereof when said ratchet pawl engages said desired one of said plurality of teeth.

6. The apparatus of claim 1, wherein said take-up assembly further comprises an axial slot to firmly capture an end of said cargo strap.

7. The apparatus of claim 1, further comprising a guide roll rotatably attached to opposing inside surfaces of said aperture and positioned slightly behind and above said take-up assembly;

wherein said guide roll serves to guide said cargo strap during clockwise and counter-clockwise rotation of said gear assembly; and, wherein said guide roll aligns said cargo strap with said take-up assembly.

8. The apparatus of claim 1, wherein said crank assembly further comprises an input drive and a handle;

wherein said input drive of said crank assembly is removably attached to said gear assembly to transfer a force exerted on said crank assembly to rotate said gear assembly.

9. The apparatus of claim 1, wherein said fastening member is located on a rear surface of said case opposite said aperture and further comprises a toggle strap.

10. The apparatus of claim 1, wherein said fastening member is located on a rear surface of said case opposite said aperture and further comprises a plurality of fastener apertures for receiving one of a plurality of fasteners driven therethrough.

11. An apparatus for securing a tie-down strap for securing a cargo strap for a load on a vehicle comprises:

a generally rectangular case further comprising an aperture located along and partially spanning a width of a top surface and a front surface thereof for permitting passage of said cargo strap;

a gear assembly housed within said case;

a take-up assembly operably controlled by said gear assembly, said take-up assembly housed within and attached to said case;

a crank assembly operably controlling said gear assembly, said crank assembly removably connected to said gear assembly; and, a magnetic fastening member for removably attaching said apparatus to said vehicle;

wherein said apparatus is detachably removable from a side of said vehicle;

wherein said aperture further permits access to said take-up assembly;

wherein said magnetic fastening member is located on a rear surface opposite said aperture;

wherein said cargo strap is fed through said take-up assembly and secured thereto;

wherein rotation of said crank assembly operably rotates said gear assembly;

wherein a clockwise rotation of said gear assembly operably rotates said take-up assembly to spool out said cargo strap; and, wherein a counter-clockwise rotation of said gear assembly operably rotates said take-up assembly to reel in said cargo strap.

12. The apparatus of claim 11, wherein said case comprises a waterproof and resilient material of construction.

13. The apparatus of claim 11, wherein said case comprises approximately six square inches in size.

14. The apparatus of claim 11, wherein said gear assembly further comprises:

a worm gear located adjacent to said aperture on a front upper first side of said case and spanning an interior within said case;

a worm gear extension comprising a distal end of said worm gear and extending outward from said case, said worm gear extension further comprising an extension drive;

a wheel gear located within said case and affixed to a first end of said take-up assembly; and, a ratchet assembly affixed to a second end of said take-up assembly along an exterior side of said case;

wherein said worm gear is freely rotatable relative to said case;

wherein said wheel gear is operably driven by and in mechanical communication with said worm gear;

wherein said take-up assembly and said ratchet assembly is operably driven by and is rotated concurrently with said wheel gear;

wherein said crank assembly is removably connected to said extension drive of said worm gear extension to operably control said worm gear; and, wherein said ratchet assembly secures a desired position of said gear assembly to arrest an undesired rotation of said gear assembly.

15. The apparatus of claim 14, wherein said ratchet assembly further comprises:

a ratchet wheel, comprising a plurality of asymmetric sloped teeth about a perimeter thereof; and, a ratchet pawl attached to an outer surface of said case superjacent to said ratchet wheel via a spring-loaded ratchet pawl axle;

wherein said ratchet pawl engages a desired one of said plurality of teeth of said ratchet wheel and arrests further rotation thereof; and, wherein said plurality of teeth of said ratchet wheel are oriented in such a way as to arrest counter-clockwise rotation thereof when said ratchet pawl engages said desired one of said plurality of teeth.

16. The apparatus of claim 11, wherein said take-up assembly further comprises an axial slot to firmly capture an end of said cargo strap.

17. The apparatus of claim 11, further comprising a guide roll rotatably attached to opposing inside surfaces of said aperture and positioned slightly behind and above said take-up assembly;

wherein said guide roll serves to guide said cargo strap during clockwise and counter-clockwise rotation of said gear assembly; and, wherein said guide roll aligns said cargo strap with said take-up assembly.

18. The apparatus of claim 11, wherein said crank assembly further comprises an input drive and a handle;

wherein said input drive of said crank assembly is removably attached to said gear assembly to transfer a force exerted on said crank assembly to rotate said gear assembly.

\* \* \* \* \*